(12) United States Patent
Papp et al.

(10) Patent No.: US 8,837,817 B2
(45) Date of Patent: Sep. 16, 2014

(54) METHOD AND DEVICE FOR CALCULATING A DEPTH MAP FROM A SINGLE IMAGE

(75) Inventors: Gergely-Istvan Papp, Grenoble (FR); Jérôme Dias, Villeurbanne (FR); Stéphane Getin, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 64 days.

(21) Appl. No.: 13/562,652

(22) Filed: Jul. 31, 2012

(65) Prior Publication Data

US 2013/0034297 A1    Feb. 7, 2013

(30) Foreign Application Priority Data

Aug. 4, 2011  (FR) ..................................... 11 57149

(51) Int. Cl.
*G06K 9/00* (2006.01)

(52) U.S. Cl.
USPC ........................................ 382/154; 382/228

(58) Field of Classification Search
USPC ........................................ 382/128, 154, 228
See application file for complete search history.

(56) References Cited

U.S. PATENT DOCUMENTS

| | | | | |
|---|---|---|---|---|
| 8,406,548 B2* | 3/2013 | Ali et al. | | 382/254 |
| 8,503,801 B2* | 8/2013 | Schiller et al. | | 382/228 |
| 2008/0175452 A1* | 7/2008 | Ye et al. | | 382/128 |
| 2009/0207288 A1 | 8/2009 | Tanaka et al. | | |
| 2009/0268985 A1 | 10/2009 | Wong et al. | | |
| 2010/0034457 A1* | 2/2010 | Berliner et al. | | 382/154 |
| 2012/0113227 A1* | 5/2012 | Paik et al. | | 348/46 |
| 2012/0236934 A1* | 9/2012 | Chen et al. | | 375/240.03 |
| 2013/0034297 A1* | 2/2013 | Papp et al. | | 382/154 |

OTHER PUBLICATIONS

Paolo Favaro, "Depth from focus/defocus", Jun. 25 2002, p. 1-6.*
Preliminary French Search Report issued Mar. 15, 2012 in French Patent Application No. FR 1157149 filed Aug. 4, 2011 (with English Translation of Category of Cited Documents).
Alex Paul Pentland, "A New Sense for Depth of Field", I.E.E.E. Transactions on Pattern Analysis & Machine Intelligence, vol. PAMI-9, No. 4, XP-001375688, Jul. 1, 1987, pp. 523-531.
Earl Wong, "A New Method for Creating a Depth Map for Camera Auto Focus Using an All in Focus Picture and 2D Scale Space Matching", IEEE International Conference on Acoustics, Speech and Signal Processing, CAASP 2006 Proceedings, vol. 3, May 14, 2006, pp. III-1184-III-1187.

(Continued)

*Primary Examiner* — Gregory M Desire
(74) *Attorney, Agent, or Firm* — Oblon, Spivak, McClelland, Maier & Neustadt, L.L.P.

(57) ABSTRACT

A method for calculating a depth map from an original matrix image, comprising the steps of: calculating a first matrix image corresponding to the original matrix image with a low resolution and in which the depth of field is similar to that of the original matrix image, calculating a second matrix image corresponding to the original matrix image with a low resolution, comprising a number of pixels similar to that of the first matrix image and in which the depth of field is greater than that of the original matrix image, implementing a DFD type three-dimensional reconstruction algorithm from the first and the second matrix images, outputting the depth map.

10 Claims, 4 Drawing Sheets

(56) References Cited

OTHER PUBLICATIONS

Y.F. Wang, et al., "3D Shape and Motion Analysis from Image Blur and Smear: A Unified Approach", Proceedings on the International Conference on Computervision, XP-002398151, Jan. 4, 1998, pp. 1029-1034.

Deepu Rajan, et al., "Simultaneous Estimation of Super-Resolved Scene and Depth Map from Low Resolution Defocused Observations", IEEE Transactions on Pattern Analysis and Machine Intelligence, vol. 25, No. 9, Sep. 1, 2003, pp. 1102-1117.

Francesc Moreno-Noguer, et al., "Active Refocusing of Images and Videos", ACM Transactions on Graphics, vol. 26, No. 3, Article 67, XP-002610925, Jul. 1, 2007, pp. 67.1-67.9.

Christel-Loic Tisse, et al., "Extended depth-of-field (EDoF) using sharpness transport across colour channels", Society of Photo-Optical Instrumentation Engineers (SPIE) Conference Series, vol. 7061, 2008, pp. 706105-1-706105-12.

Ashutosh Saxena, et al., "Learning Depth from Single Monocular Images", NIPS 18, 2005, 8 pages.

Jae-Il Jung, et al., "Depth Map Estimation from Single-View Image Using Object Classification Based on Bayesian Learning", 3DTV-Conference:The True Vision—Capture, Transmission and Display of 3D Video (3DTV-CON), 2010, 4 pages.

Yutthana Lila, et al., "3D Shape Recovery from Single Image by using Texture Information", International Conference on Control, Automation and Systems, Oct. 14-17, 2008, pp. 2801-2806.

José R.A. Torreão, et al., "Single-Image Shape from Defocus", SIBGRAPI, 2005, 6 pages.

\* cited by examiner

METHOD AND DEVICE FOR CALCULATING A DEPTH MAP FROM A SINGLE IMAGE

TECHNICAL FIELD

The invention relates to a method and a device for calculating, or estimating or instead reconstructing, three-dimensional images visually representing the distances between observed objects or elements and the shooting location of said objects or elements. In such images, known as depth maps, the luminosity and/or the colour represented are for example a function of said distance.

The invention enables in particular a depth map to be calculated and reconstructed from a single original digital matrix image.

The invention relates to the general field of imaging, and finds applications in various fields such as that of equipment (cameras or digital photographic devices) for surveillance, industrial production control, telemetry (automobile, leisure, avionics, defence), robotics, archaeology, guiding of vehicles, geology, cartography, design, applied imaging in biology, medical imaging, human-machine interfaces, re-dimensioning of images, or instead restoration of images.

PRIOR ART

To construct depth maps, three-dimensional reconstruction methods exist based on the exploitation of the depth of field of different images. In this type of approach, the acquisition device is in general a conventional camera (or a photographic device), equipped with a single optical objective coupled to a single matrix of pixels. These methods generally exploit the blur, or fuzzy, or out of focus, level present in the acquired images to estimate the information relative to the depth of the elements present in the acquired images.

These methods require at least two images taken with different optical parameters (aperture, focusing, etc.), but without changing the spatial distribution of the objects of the captured scene, or the acquisition device.

A first of these methods known as DFF (Depth From Focus) consists in carrying out several shootings of the scene (with a small depth of field) while shifting the focusing plane each time. In this way, on each image taken, only the elements lying within a given "range of depths" are sharp. By then recombining the sharp zones of the different images captured, it is possible to construct a depth map, plane by plane. Such a method is for example described in the document "Extended depth-of-field (EDoF) using sharpness transport across colour channels" of C. L. Tisse et al., Society of Photo-Optical Instrumentation Engineers (SPIE) Conference Series, 2008, vol. 7061.

Methods using this approach give good results as regards the precision of the three-dimensional reconstruction.

Nevertheless, they require, for the construction of a single depth map of a scene, a very high number of images of said scene, which poses problems particularly when the elements of the scene are moving.

Another three-dimensional reconstruction method, known as DFD (Depth From Defocus), is based on the measurement of the blur level in the images.

Knowing the optical parameters of the imaging system used for the acquisition of images and the blur level corresponding to each pixel, it is possible to construct a depth map. This method is described in the document "A new sense for Depth of Field" of A. P. Pentland, IEEE Transactions on pattern analysis and machine intelligence, vol. PAMI-9, n°4, July 1987.

This method nevertheless has the drawback of requiring two images of the scene taken with different apertures to be able to construct a depth map of the scene.

Probabilistic methods exist, based on a learning phase, making it possible to construct a depth map from a single image. After having carried out the learning phase of software implementing such learning, it is possible to apply these methods to single images.

The use of probabilistic indicators (Markov random field, etc.), making it possible to determine the depth map, imposes a very significant computational load (in other words hardware and/or software calculation resources). In addition, the learning phase imposes quite limited typologies of scenes (square objects, large geometric extent, etc.).

Other methods enable the blur level present in each region of an original image to be determined.

These methods, based on wavelet transforms, convolutions or de-convolutions, nevertheless have a tendency to be demanding in computational terms, and do not give very precise results.

DESCRIPTION OF THE INVENTION

Thus there is a need to propose a novel method and a novel device making it possible to calculate, or to estimate or to construct with precision, a depth map, or three-dimensional image, from a single matrix image captured by a single 2D acquisition device comprising a single matrix of pixels, in other words not requiring the use of a complex acquisition device or several images of the scene, and in which the computational load making it possible to calculate the depth map is reduced.

To do this, one embodiment of the present invention proposes a method for calculating a depth map from an original matrix image, comprising at least the steps of:
  calculating a first matrix image corresponding to the original matrix image with a low resolution and in which the depth of field is similar to that of the original matrix image,
  calculating a second matrix image corresponding to the original matrix image with a low resolution, comprising a number of pixels similar to that of the first matrix image and in which the depth of field is greater than that of the original matrix image,
  implementing a DFD type three-dimensional reconstruction algorithm from the first and the second matrix images, outputting the depth map.

This method makes it possible to emulate different topologies of the acquisition device, or imaging system, having served to make the acquisition of the original matrix image from which the depth map is calculated, by simulating, a posteriori, in other words after having performed the acquisition of the image, the depth of field of the acquisition device. From two calculated images with different depths of field, one may thus implement a DFD type algorithm making it possible to calculate, by measuring the blur levels in the two calculated images, a depth map.

It is possible to calculate more than two images with different depths of field. The number of calculated images is a function of the number of images that the DFD algorithm requires to calculate the depth map.

The calculation of the first matrix image may be carried out by associating, with each pixel of the first matrix image, a first group of adjacent pixels of the original matrix image distinct from the first groups of pixels associated with other pixels of the first matrix image, the value of each pixel of the first matrix image which may be calculated from values of all the pixels of the first group of pixels associated with said pixel of the first matrix image, and/or in which the calculation of the second matrix image may be carried out by associating, with each pixel of the second matrix image, a second group of adjacent pixels of the original matrix image distinct from the second groups of pixels associated with the other pixels of the second matrix image, the value of each pixel of the second matrix image which may correspond to the value of one of the pixels of the second group of pixels associated with said pixel of the second matrix image.

In this case, the values of the pixels of the first matrix image may be calculated by binning pixels of the original matrix image, the values of the pixels of the second matrix image being able to be calculated by sub-sampling of the original matrix image.

Each of the first and second groups of pixels may form a square of at least four pixels.

The steps of calculating the first matrix image, calculating the second matrix image and implementing the three-dimensional reconstruction algorithm may be repeated several times while modifying, at each iteration, the dimensions of the first and/or the second groups of pixels and/or a value of spacing and/or of overlapping between two first or second groups of adjacent pixels, the results obtained at each implementation of the DFD type three-dimensional reconstruction algorithm may be accumulated and used to calculate the depth map.

The three-dimensional reconstruction algorithm may comprise at least the steps of:
  digital processing of the second matrix image blurring the second matrix image,
  dividing the first matrix image and the second blurred matrix image into several groups of pixels,
  for each group of pixels, calculating a two-dimensional correlation between the groups of pixels of the first matrix image and the groups of pixels of the second blurred matrix image,
  updating the depth map from the results of the two-dimensional correlations calculated previously.

The digital processing of the second matrix image may correspond to the implementation of a convolution of the second matrix image by a Gaussian curve.

The method may moreover comprise, prior to calculating the first matrix image, a step of acquisition of the original matrix image.

Another embodiment of the invention also relates to a device for calculating a depth map from an original matrix image, comprising at least:
  means for calculating a first matrix image corresponding to the original matrix image with a low resolution and in which the depth of field is similar to that of the original matrix image,
  means for calculating a second matrix image corresponding to the original matrix image with a low resolution, comprising a number of pixels similar to that of the first matrix image and in which the depth of field is greater than that of the original matrix image,
  means for implementing a DFD type three-dimensional reconstruction algorithm from the first and the second matrix images, outputting the depth map.

Another embodiment proposes a device for calculating a depth map from an original matrix image, comprising at least:
  a calculator of a first matrix image corresponding to the original matrix image with a low resolution and in which the depth of field is similar to that of the original matrix image,
  a calculator of a second matrix image corresponding to the original matrix image with a low resolution, comprising a number of pixels similar to that of the first matrix image and in which the depth of field is greater than that of the original matrix image,
  a device for implementing a DFD type three-dimensional reconstruction algorithm from the first and the second matrix images, outputting the depth map.

The device may moreover comprise an acquisition device of the original matrix image.

BRIEF DESCRIPTION OF DRAWINGS

The present invention will be better understood on reading the description of embodiment examples given purely by way of indication and in no way limiting while referring to the appended drawings in which.

Identical, similar or equivalent parts of the different figures described hereafter bear the same numerical references so as to make it easier to go from one figure to the next.

In order to make the figures easier to read, the different parts represented in the figures are not necessarily shown at a uniform scale.

The different possibilities (variants and embodiments) should be understood as not being exclusive to each other and may be combined together.

DETAILED DESCRIPTION OF PARTICULAR EMBODIMENTS

Figure 1:
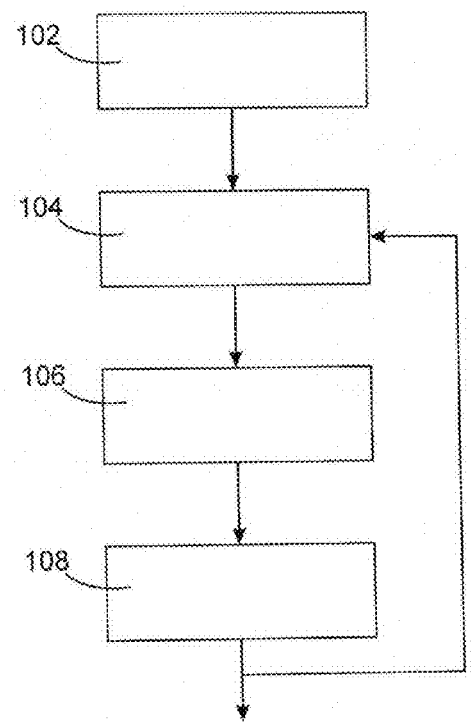
FIG. 1 represents the steps of a method for calculating a depth map from a single original image.

Reference is made to FIG. 1 which represents the steps of a method for calculating a depth map carried out from a single original image.

Firstly a capture is carried out of the scene that it is wished to calculate, from a single image of said scene, a depth map (step 102). To do this, the acquisition is made of an image of the scene by a digital image acquisition device, for example a photographic device or a digital video camera, comprising in particular an optic that makes it possible to focus the light of the scene on a matrix of pixels of the acquisition device. The optical parameters of the acquisition device (focal length, diaphragm aperture, etc.) as well as the distance between the optic of the acquisition device and the scene are chosen such that the captured image comprises sharp zones and blurred zones, in other words such that all the elements of the captured scene are not included in the depth of field of the acquisition device. It may be decided to carry out preferably the acquisition of the original matrix image with a small depth of field, for example less than several centimetres, for example less than around 10 cm or 5 cm.

One then calculates, by a digital processing of the original matrix image acquired, two matrix images with a low resolution, that is sub-sampled images or downsampled images, in other words of resolution (number of pixels) less than that of the original matrix image, representing the captured scene, the two images having different depths of field (step 104).

Depending on the DFD algorithm used, it is possible to calculate more than two images of different depths of field with a low resolution.

The depth of field (known as DOF) of an imaging system, or acquisition device, is equal to:

$$DOF = \frac{2d_{pupille} g d_{focalisation}}{d_{pupille}^2 - g^2} \quad (1)$$

$$\text{with } g = \frac{\delta}{G_t}$$

g: object space grain, which represents the size of a pixel reduced to the object space;

$d_{pupille}$: diaphragm aperture of the imaging system;

$d_{focalisation}$: focusing distance of the imaging system;

$G_t$: transversal enlargement of the imaging system;

$\delta$: size (dimensions of a side) of a pixel of the imaging system.

The images representing the scene captured with different depths of field are going to be calculated by "virtually" varying parameter $\delta$, in other words by simulating a modification of the size and/or the spacing of the pixels of the imaging system. Thus, one emulates an imaging system comprising a sensor with pixel sizes different to the real size of the pixels of the system, and with optional spacings or overlaps between the pixels.

A first of the two calculated matrix images is obtained by carrying out a "binning", or gathering together, of the pixels forming part of groups of neighbouring pixels of the original matrix image. Thus, one considers that the pixels of each of said groups of neighbouring pixels of the original matrix image form a single macro-pixel that corresponds to a pixel of the first calculated matrix image.

Figure 2:
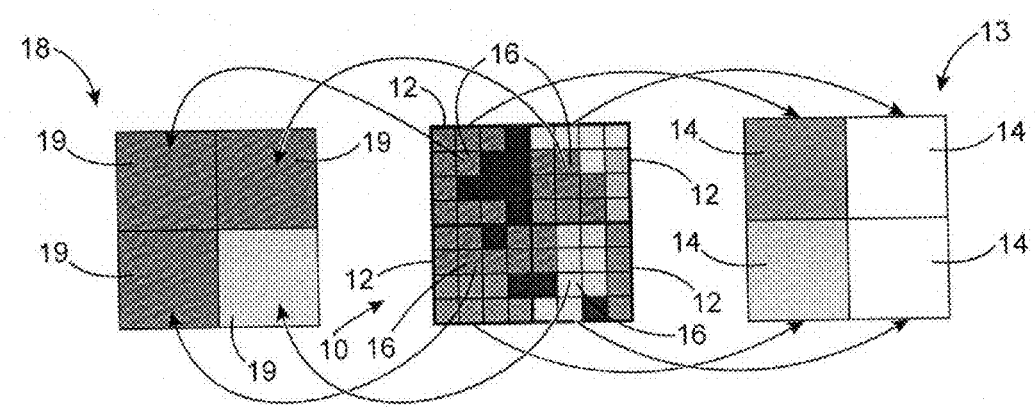
FIGS. 2 to 5 illustrate the calculations of the first and second matrix images carried out from the original image during a method for calculating a depth map.

The principle of such binning of pixels is illustrated in FIG. 2. This example is described here for a part of the original matrix image 10 corresponding to a matrix of 8×8 pixels from which one wishes to emulate a matrix of 2×2 macro-pixels corresponding to a matrix of 2×2 pixels of the first calculated matrix image 13. To carry out such a binning, one firstly defines acquisition windows 12 intended to delimit the macro-pixels. In the example of FIG. 2, one defines acquisition windows 12 equivalent to squares of 4×4 neighbouring pixels, the size $W_{fenetre}$ of which, corresponding to the dimension of a side of one of the windows 12, corresponds to the number of pixels of a side of one of the groups of neighbouring pixels ($W_{fenetre}=4$ in the example of FIG. 2). Thus, each group of sixteen neighbouring pixels forming a square of 4×4 pixels in the original matrix image 10 is assimilated to a single macro-pixel of size equivalent to that of the window 12 and which corresponds to a single pixel 14 of the first calculated matrix image 13.

In the first calculated matrix image 13, the value of each pixel 14 is determined from values of all the pixels included in the acquisition window 12 corresponding to said pixel 14.

The value of each pixel 14 may for example be equal to the average value of all the pixels included in the acquisition window 12 defining the pixel 14. In a variant, it is also possible to carry out, for the calculation of the value of each pixel 14, a weighted average of the values of the pixels included in the window 12 in order to give a more or less considerable weighting to certain pixels. It is also possible to only consider a part of the pixels included in one of the acquisition windows to calculate the value of the corresponding macro-pixel. In this case, one or more weighting factors may be considered as zero.

This calculation is carried out for all the groups of pixels of the original matrix image 10, thus determining the values of all the pixels of the first matrix image 13.

By carrying out such a binning of the pixels of the original matrix image 10, one thus calculates a first matrix image 13 of resolution less than that of the original matrix image 10.

One thus emulates the capture of the scene by an acquisition device that would comprise a matrix of pixels, the photoreceptors of which would each have a side of dimension equal to $W_{fenetre}$ (this dimension being expressed here in number of pixels). In the example described previously with reference to FIG. 2, the first calculated matrix image 13 has a resolution 16 times less than that of the original matrix image 10.

Returning to equation (1) described previously, the depth of field $DOF_1$ of the first calculated matrix image 13 c is equal to:

$$DOF_1 = \frac{2d_{pupille} g W_{fenetre} d_{focalisation}}{d_{pupille}^2 - g^2 W_{fenetre}^2} \quad (2)$$

The depth of field of the first matrix image 13 is similar to that of the original matrix image 10 because the difference of the value of the parameter $W_{fenetre}$ between these two images is compensated by the difference of the value of the parameter g between these two images.

One then calculates, from the original matrix image 10, a second matrix image 18 by carrying out a sub-sampling of the original image 10. Such a sub-sampling consists in only taking into account part of the pixels forming the original matrix image 10 to calculate the values of the pixels 19 of the second matrix image 18. As for the first image 13 previously calculated, one considers the matrix of pixels of the original image 10 as formed of several groups of neighbouring pixels, each group of pixels representing a macro-pixel corresponding to a pixel of the second calculated matrix image 18.

Returning to the example of FIG. 2, one generates the second matrix image 18 by considering that the value of each pixel 19 is determined not from values of all the pixels included in each of the acquisition windows 12 defining the macro-pixels, but by choosing the value of one of the pixels included in each acquisition window 12. The pixel included in each of the acquisition windows 12 which serves to determine the value of the corresponding pixel of the second matrix image 18 may correspond to one of the pixels situated substantially at the centre of the windows 12.

In the example of FIG. 2, it is for example possible to choose, in each window 12, the value of the pixel referenced 16 to determine the value of the corresponding pixel 19.

This calculation is carried out for all of the groups of pixels of the original matrix image 10 in order to determine the values of all the pixels of the second matrix image 18.

In a preferred embodiment, the pixels chosen in the acquisition windows for the calculation of the second matrix image 18 are regularly spaced from each other, thus making easier the calculation of the second matrix image 18 and enables to obtain a very good sub-sampling of the original matrix image 10.

However, it is also possible to choose, in the different groups of pixels, for the calculation of the values of pixels of the second matrix image 18, pixels which are differently spaced from each other, that is irregularly spaced from each other, that also enables to obtain a sub-sampled image 18 having a depth of field greater than that of the original image 10.

By carrying out such a sub-sampling of the original matrix image 10, one thus calculates a second matrix image 18, the resolution of which is less than that of the original matrix image 10 and similar to that of the first calculated matrix image 13 (of resolution 16 times less than that of the original matrix image 10 in the example of FIG. 2). On the other hand, one emulates the capture of the scene by an acquisition device that would comprise a matrix of pixels, the photoreceptors of which would each have a side of dimension equal to $2W_{fenetre}-1$ (expressed in number of pixels, here equal to 7).

Such a sub-sampling thus simulates an increase in the depth of field of the original image.

Thus, for a blurred zone spread out over several neighbouring pixels of the original matrix image 10 and the information of which, if it was included in the depth of field, would correspond to a single pixel, such a sub-sampling makes it possible to avoid an overflow of the information onto the neighbouring pixels, thereby eliminating blurring.

Returning to equation (1) described previously, the depth of field $DOF_2$ of the second calculated matrix image 18 is equal to:

$$DOF_2 = \frac{2d_{pupille}g(2W_{fenetre} - 1)d_{focalisation}}{d_{pupille}^2 - g^2(2W_{fenetre} - 1)^2} \quad (3)$$

In the example described previously with reference to FIG. 2, the acquisition windows 12 define groups of pixels stuck together. Nevertheless, it is possible to calculate the two matrix images 13 and 18 by spacing the acquisition windows 12 apart from each other. Such an example is represented in FIG. 3.

Figure 3:
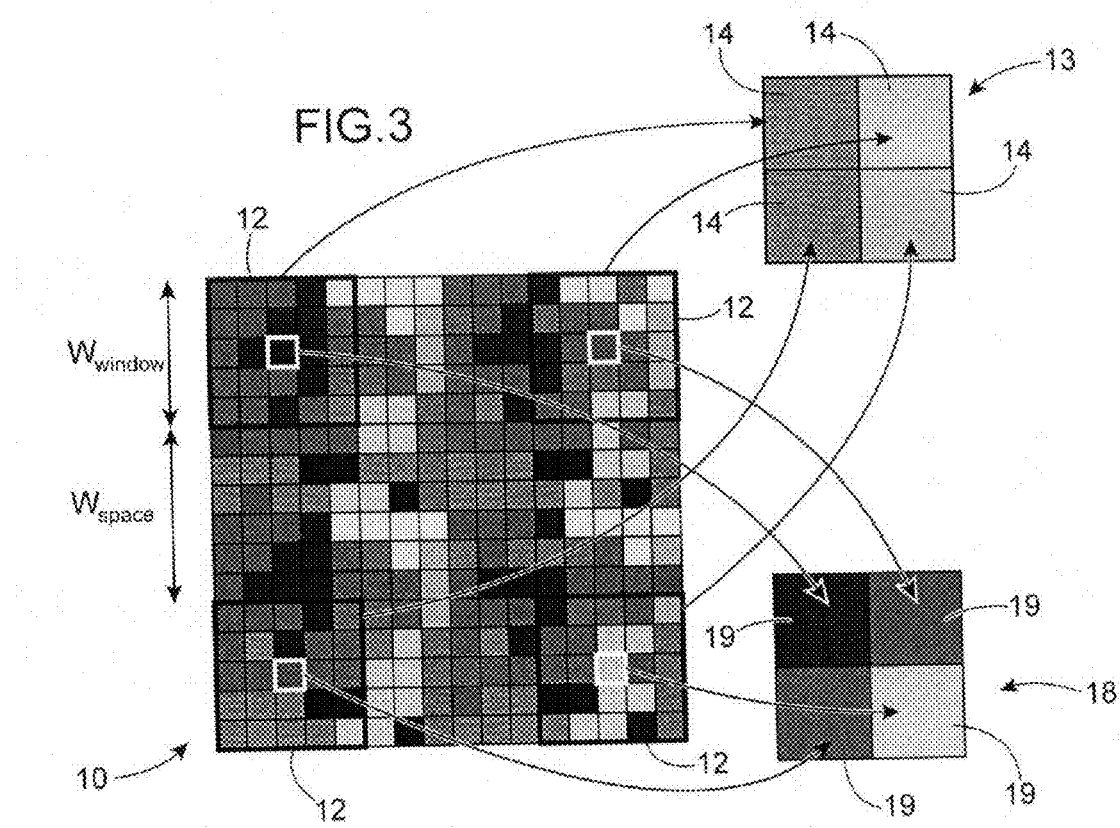

In this FIG. 3, one considers a part of the original matrix image 10 forming a matrix of 16×16 pixels. One defines the acquisition windows 12 such that each includes a group of 5×5 neighbouring pixels of the original image 10, in other words the size $W_{fenetre}$ of which is equal to 5. The neighbouring acquisition windows 12 are spaced apart by a distance $W_{espace}$ also expressed in number of pixels and here equal to 6. Given the spacing of the acquisition windows 12, certain pixels of the original image 10 are not taken into account to calculate the two matrix images 13 and 18.

One calculates, by the pixel binning technique described previously, the first matrix image 13 in which the values of the pixels 14 are each equal to the average value of the pixels included in the corresponding acquisition window 12. One also generates by sub-sampling, as described previously, the second matrix image 18 in which the values of the pixels 19 are each equal to the value of one of the pixels included in the corresponding acquisition window 12 (for example here the central pixel of each window 12).

By considering the spaces between the acquisition windows 12, the depth of field $DOF_1$ of the first of the two calculated images 13 is equal to:

$$DOF_1 = \frac{2d_{pupille}g(W_{fenetre} + 2W_{espace})d_{focalisation}}{d_{pupille}^2 - g^2(W_{fenetre} + 2W_{espace})^2} \quad (4)$$

The depth of field of the second of the two generated images 28 is equal to:

$$DOF = \frac{2d_{pupille}g(2(W_{fenetre} + W_{espace}) - 1)d_{focalisation}}{d_{pupille}^2 - g^2(2(W_{fenetre} + W_{espace}) - 1)^2} \quad (5)$$

Equations (2) and (3) described previously correspond to equations (4) and (5) above taking $W_{espace}=0$.

Figure 4:
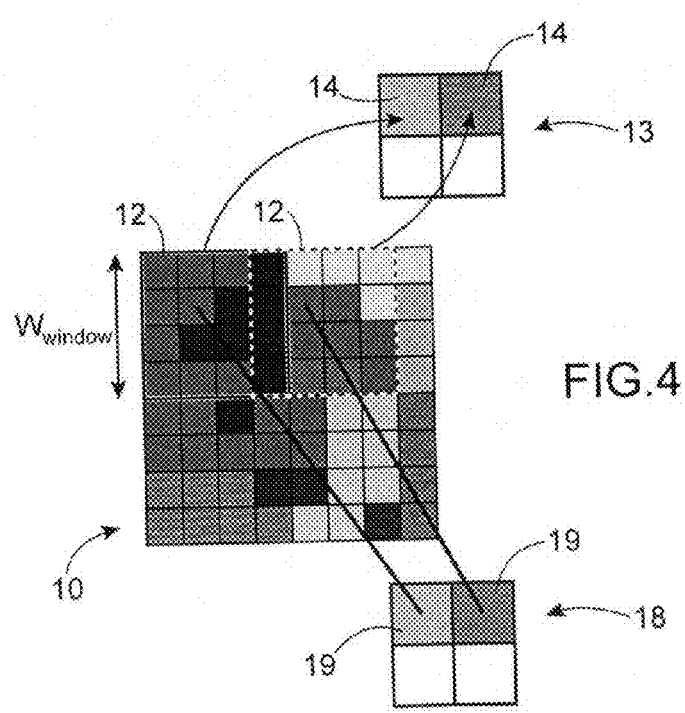

It is also possible that the acquisition windows 12 are not spaced apart from each other, but on the contrary they cover, or partially overlap, each other. FIG. 4 represents the case where the acquisition windows 12 cover each other by a space $W_{espace}$ equal to one pixel.

The depths of field of the two calculated matrix images 13 and 18 correspond to the previously described equations (4) and (5), the value of $W_{espace}$ being in this case negative.

It may thus be seen that $W_{fenetre}$ and $W_{espace}$ are the parameters that make it possible, as a function of their values, to obtain the desired depth of field in the two calculated matrix images 13 and 18.

Figure 5:
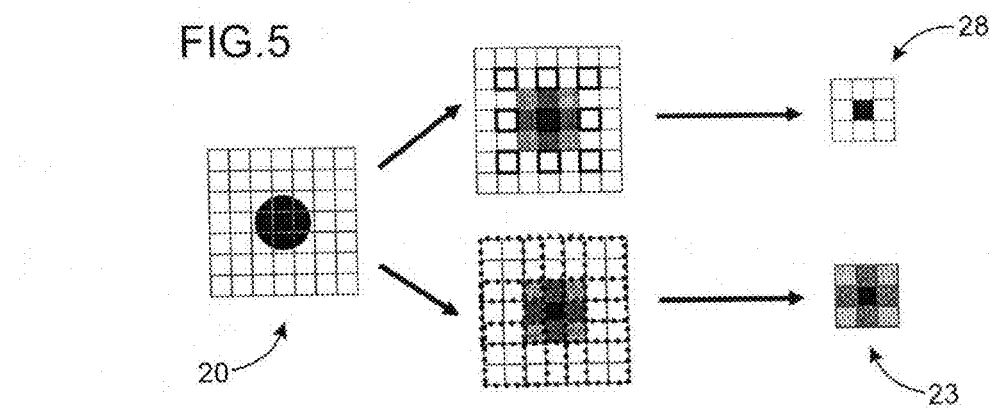

The sizes of the pixels of the first and the second matrix images calculated may be different depending on the values of $W_{fenetre}$ and $W_{espace}$ chosen. In FIG. 5 are described the results obtained for a blurred spot imaged on a matrix of 7×7 pixels referenced 20, in which an information captured at the level of the central pixel of the matrix 20 spread out (said spreading out corresponding to the blurring) on the pixels adjacent to the central pixel. One chooses $W_{fenetre}=3$ and $W_{espace}=-1$.

By calculating, by binning of pixels, a first matrix image 23 in a manner analogous to the calculation described previously of the first matrix image 13, it may be seen that the blurred spot is found in all of the considered macro-pixels, and thus in all the pixels of the first calculated matrix image 23 with different intensities. Each macro-pixel here has an equivalent size defined by $W_{fenetre}+2W_{espace}=1$ pixel.

The blurred spot is thus spread out, in this first image 23, in a zone of size corresponding to 3×3 pixels of the initial matrix 20.

By applying a sub-sampling to the original image 20, a second matrix image 28 is obtained, the value of each macro-pixel corresponding to the value of the central pixel of each acquisition window. In this second matrix image 28, the blurred spot is found only in the central macro-pixel. Nevertheless, each macro-pixel has here a size equivalent (dimension of a side) to three pixels because:

$2(W_{fenetre}+W_{espace})-1=3$.

The blurred spot is thus also spread out, in this second image 28, in a zone of size corresponding to 3×3 pixels of the initial matrix 20.

Thus, in the case of the first matrix image 23, on account of the fact that the blurred spot is found on the 9 pixels of the first image 23, this signifies that the depth of field of said first image 23 is the same as that of the original image 20, and in the case of the second image 28, the depth of field is increased compared to that of the original image 20. In the two cases, the resolution, or size, of the image is reduced, going from 7×7 pixels to 3×3 pixels.

After having calculated the two matrix images 13 and 18 of different depths of field, one implements a DFD type three-dimensional reconstruction algorithm making it possible to calculate, from two matrix images calculated previously, one by binning of pixels and the other by sub-sampling, a depth map of the initial matrix image (step 106). The principles of an example of such a DFD algorithm are briefly described below.

One firstly carries out a digital processing of the second matrix image 18 (that calculated by sub-sampling) in order to artificially blur this image. Such a digital processing may consist for example in carrying out a convolution of this second image by a Gaussian curve. One thus emulates a situation in which all the captured scene would be found in a same plane outside of the depth of field of the imaging device.

One then performs a meshing of the first matrix image 13 and the second blurred matrix image 18 consisting in dividing these images into several regions, in other words into several groups of pixels, for example of rectangular shapes.

For each region, or each group of pixels, one calculates a correlation 2D, in other words two-dimensional, between the two images, region by region. The results of this correlation make it possible to calculate the depth map of the original matrix image by deduction of the quantity of blurring present between the two images.

Details and precisions concerning the implementation of such a DFD algorithm are described for example in the document "A new method for creating a depth map for camera auto focus using an all in focus picture and 2D scale space matching" by Earl Wong, International conference on acoustics, Speech and signal Processing, 2006, 14-16 May, Toulouse, France, PP III-III. In this document, the DFD algorithm makes a calculation of a correlation between two images (selection of only one of the captured images before the calculation of the correlation).

One thereby obtains a depth map for a given value of $W_{fenetre}$ and a given value of $W_{espace}$. The steps 104 and 106 are repeated in order to obtain other depth maps for other values of $W_{fenetre}$ and $W_{espace}$. The different depth maps obtained are added as one advances to each other (step 108) in order to obtain at the end of the method a global depth map, the depth maps being averaged after interpolation. In the example of the DFD algorithm described previously, for each region of the two images with a low resolution, the value of the 2D correlation obtained is taken into account if it is greater than the values obtained previously during preceding iterations, the depth map being in this case updated for the region concerned, the Gaussian curve being able to vary at each iteration.

One thus calculates, at each iteration, a pair of matrix images corresponding to the original image with a low resolution, and one calculates, from this pair of images with a low resolution and different depths of field, a depth map, the depth maps obtained during different iterations being summed, which makes it possible to reduce the importance of ambiguous points (points appearing when the blurring functions of two images do not change plateaus at the same depths) and to access all of the depth planes of the scene in a coherent manner.

The parameters $W_{fenetre}$ and $W_{espace}$ are for example chosen such that:

$$W_{fenetre} \in [4; 18]$$

$$W_{espace} \in \left[ -\frac{W_{fenetre}}{2} + 1; 0; \frac{W_{fenetre}}{2} \right]$$

The value of $W_{fenetre}$ is in this case a whole number varying from 4 to 18. The value of $W_{espace}$ is a whole number taking the value $-W_{fenetre}/2$, 0 or $W_{fenetre}/2$.

The maximal and minimal values of $W_{fenetre}$ are for example determined empirically as a function in particular of the resolution of the original image. The method may be implemented by choosing the value of $W_{fenetre}$ in a range of values comprising for example between 2 and 20 different values.

The value of $W_{espace}$ corresponds to the range of depths considered in the captured scene, and the different values of $W_{fenetre}$ correspond to the different depth planes inside the range of depths fixed by $W_{espace}$.

It is possible to choose the value of $W_{espace}$ in a range of values comprising for example between 2 and 20 different values.

The DFD three-dimensional reconstruction algorithm may be implemented by carrying out a number of iterations comprised between around 20 and 50 (equal to 45 in the example described previously).

Figure 6:
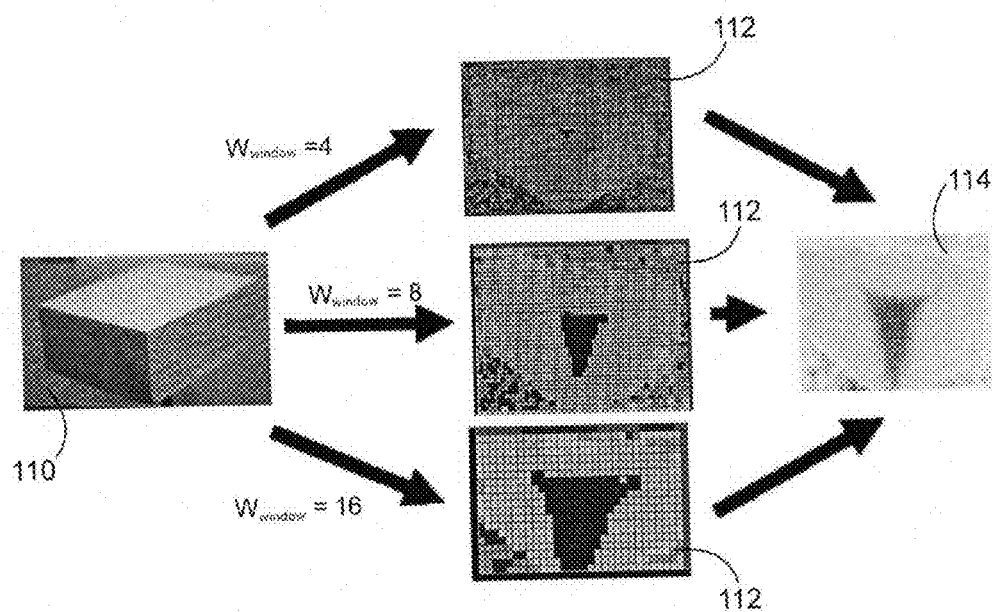
FIGS. 6 and 7 represent examples of depth maps obtained during the implementation of a method for calculating a depth map.

FIG. 6 represents depth maps 112 obtained from an original image 110 with $W_{espace} = -W_{fenetre}/2 + 1$ and $W_{fenetre}$ equal to 4, 8 and 16, said depth maps 112 being summed within a depth map 114 representative of the spacing $W_{espace} = -W_{fenetre}/2 + 1$.

Figure 7:
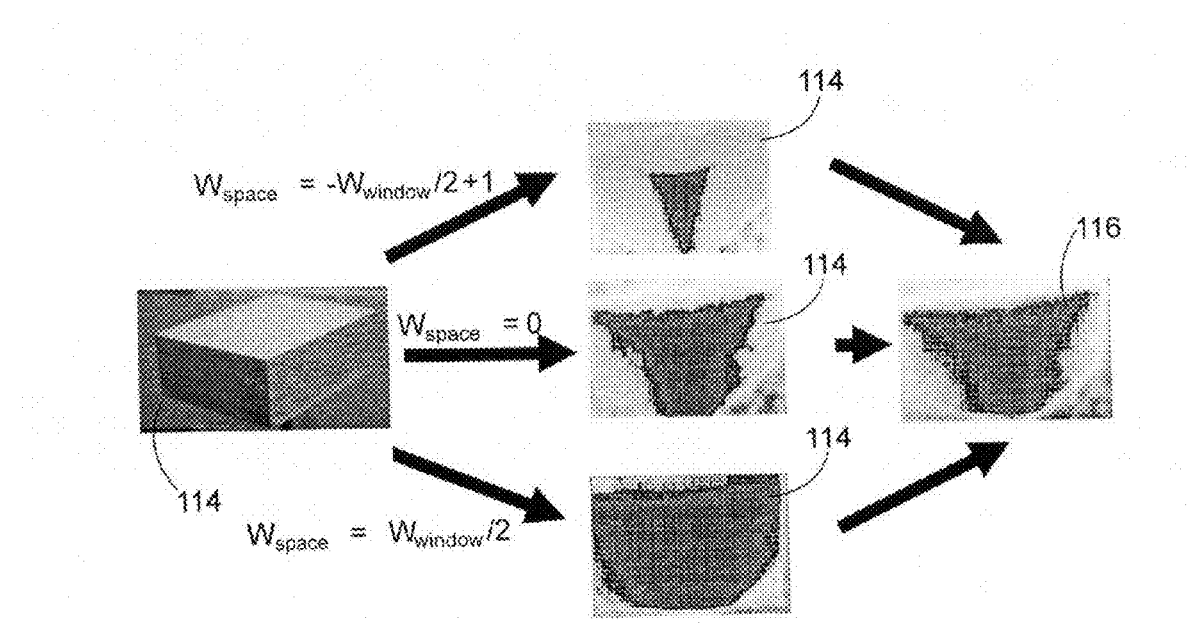

By varying $W_{espace}$, one recombines the depth maps 114 obtained with the different spacings within a global depth map 116 reflecting with precision the different depths of the elements captured in the original image 110 (see FIG. 7).

By varying the positioning of the acquisition windows, one obtains a global depth map 116 having the same resolution as the original image 110.

Different colours are for example used in the global depth map to represent the different depth levels. The original image may also be applied as texture over the global depth map 116 obtained in order to reconstruct in a three-dimensional manner the original scene captured.

In the examples described previously, the acquisition windows serving to define the macro-pixels are of rectangular shapes, for example squares, and of similar sizes. Nevertheless, it is possible to choose acquisition windows, whether during the generation of the image by binning of pixels and/or during the generation of the image by sub-sampling, of different sizes from one macro-pixel to the next and/or of different shape (non square rectangular or even of non rectangular shape, for example hexagonal). The shape of the acquisition windows 12 may also be chosen such that it comes close to a circular shape, in other words a shape similar to the captured blurred spots, or ellipsoidal in order to take into account the potential optical aberrations which could deform the blurred spots.

The principles are described below of a second example of a DFD type three-dimensional reconstruction algorithm making it possible to calculate, from two matrix images 13 and 18 calculated previously, one by binning of pixels and the other by sub-sampling, a depth map of the initial matrix image.

The principal plane-object distance $d_{objet}$ is equal to:

$$d_{objet} = \frac{f d_{capteur}}{d_{capteur} - f - \sigma k n} \quad (6)$$

with:
f: focal length of the optical system
n: focal length/diaphragm aperture
$d_{capteur}$: lens-sensor distance
σ: variance of the point spread function (PSF), in other words its mid-height width
k: proportionality constant between σ and the diameter of a blurred spot (reflecting the unknown parameters of the acquisition device used).

If one assumes that the optical system is perfectly known, the distance $d_{objet}$ corresponding to a point of the image may be determined, by determining the spreading out of the corresponding impulse response.

One begins by taking a neighbourhood around a point in the two matrix images 13 and 18 calculated previously:

$f_1(r,\theta)$: neighbourhood taken in the sharp image, here the second matrix image 18 obtained by sub-sampling;

$f_2(r,\theta)$: neighbourhood taken of the blurred image, here the first matrix image 13 obtained by binning of pixels.

The point spread function (PSF) of the optical system used is a Gaussian function $G(r,\sigma)$.

The blur level is also invariant in the two neighbourhoods.

One calculates the Fourier transform of the two neighbourhoods:

$$F1 = TF(f_1)$$

$$F2 = TF(f_2)$$

One assumes that a sharp neighbourhood ($f_0$) exists everywhere that satisfies:

$$f_1(r,\theta) = f_0(r,\theta) \otimes G(r,\sigma_1) \text{ and}$$

$$f_2(r,\theta) = f_0(r,\theta) \otimes G(r,\sigma_2)$$

One may thus write:

$$\frac{F_1(\lambda)}{F_2(\lambda)} = \frac{F_0(\lambda) G(\lambda, 1/2\pi\sigma_1)}{F_0(\lambda) G(\lambda, 1/2\pi\sigma_2)} = \frac{G(\lambda, 1/2\pi\sigma_1)}{G(\lambda, 1/2\pi\sigma_2)} = \exp(\lambda^2 2\pi^2 (\sigma_2^2 - \sigma_1^2))$$

By considering that the neighbourhood $f_1$ is sharp everywhere ($f_1 = f_0$), one may write:

$$\sigma_1 = 0$$

Which gives:

$$\sigma_2 = \sqrt{\frac{\ln(F_1) - \ln(F_2)}{\lambda^2 2\pi^2}}$$

By replacing $\sigma_2$ in the equation (6), one obtains the distance $d_{objet}$ corresponding to the depth associated with the image point considered.

The implementation details of such a DFD method are described for example in the document "A new sense for Depth of Field" of A. P. Pentland, IEEE Transactions on pattern analysis and machine intelligence, vol. PAMI-9, n°4, July 1987.

The DFD three-dimensional reconstruction algorithm is for example implemented by mathematical calculation software such as MATLAB software, processing the original image in the form of a computer file, the data of the original image being conserved without being compressed. Such software may perform the calculation of the different pairs of matrix images with a low resolution and of different depths of field, and also implement the DFD algorithm making it possible to obtain the depth map.

Figure 8:
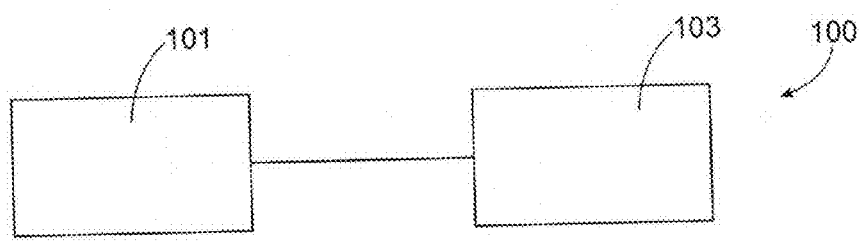
FIG. 8 represents in a schematic manner a device for calculating a depth map.

FIG. 8 represents a device 100 for calculating a depth map from an original matrix image. The device 100 comprises an acquisition device 101, for example a digital photographic device coupled to an optical objective, making it possible to capture the scene and to output the original matrix image 10. The device 100 also comprises computer means 103, or a calculator, able to calculate the different pairs of matrix images 13 and 18 corresponding to the original image with a low resolution and of different depths of field. The means or calculator 103 also make it possible to implement the DFD three-dimensional reconstruction algorithm, making it possible to calculate, from different pairs of images, the depth map. The computer means or calculator 103 comprise for example one or more computers on which software means, such as MATLAB calculation software, are installed. The computer means or calculator 103 may be coupled to the acquisition device 101, as represented in FIG. 8, in order that data exchanges can take place from the acquisition device 101 to the computer means or calculator 103. The acquisition device 101 may also be managed by the computer means 103 or calculator.

The invention claimed is:

1. A method for calculating a depth map from an original matrix image, comprising at least the steps of:

calculating, by processing circuitry, a first matrix image corresponding to the original matrix image with a first specified resolution and in which a corresponding depth of field is similar to that of the original matrix image;

calculating a second matrix image corresponding to the original matrix image with a second specified resolution, which comprises a number of pixels similar to that of the first matrix image and in which a corresponding depth of field is greater than that of the original matrix image; and outputting the depth map that results from implementing a depth from defocus (DFD) type three-dimensional reconstruction algorithm based on the first and the second matrix images, wherein each of the first specified resolution and the second specified resolution is lower than a resolution of the original matrix image.

2. The method according to claim 1, in which the calculation of the first matrix image is carried out by associating, with each pixel of the first matrix image, a first group of adjacent pixels of the original matrix image distinct from first groups of pixels associated with other pixels of the first matrix image, a value of each pixel of the first matrix image being calculated from values of all the pixels of the associated first group of adjacent pixels, and/or in which the calculation of the second matrix image is carried out by associating, with each pixel of the second matrix image, a second group of adjacent pixels of the original matrix image distinct from second groups of pixels associated with other pixels of the second matrix image, a value of each pixel of the second matrix image corresponding to a value of one of the pixels of the associated second group of adjacent pixels.

3. The method according to claim 2, in which each of the first and second groups of adjacent pixels forms a square of at least four pixels.

4. The method according to claim 2, in which the steps of calculating the first matrix image, calculating the second matrix image and implementing the DFD type three-dimensional reconstruction algorithm are iterated while modifying, at each iteration, at least one of dimensions of the first group of adjacent pixels, dimensions of the second group of adjacent pixels, a value of spacing between two first groups of adjacent pixels or between two second groups of adjacent pixels, a value of overlapping between the two first groups of adjacent pixels or between the two second groups of adjacent pixels, and results obtained at each iterative implementation of the DFD type three-dimensional reconstruction algorithm are accumulated and used to calculate the depth map.

5. The method according to claim 1, in which the DFD type three-dimensional reconstruction algorithm comprises at least the steps of:

digital processing of the second matrix image including blurring the second matrix image;

dividing the first matrix image and the blurred second matrix image into a plurality of groups of pixels;

for each of the plurality of groups of pixels, calculating a two-dimensional correlation between groups of pixels of the first matrix image and groups of pixels of the blurred second matrix image; and updating the depth map based on each two-dimensional correlation.

6. The method according to claim 5, in which the digital processing of the second matrix image corresponds to convolving the second matrix image by a Gaussian curve.

7. The method according to claim 1, further comprising, prior to calculating the first matrix image, a step of acquisition of the original matrix image.

8. A device for calculating a depth map from an original matrix image, comprising at least:

circuitry configured to:

calculate a first matrix image corresponding to the original matrix image with first specified resolution and in which a corresponding depth of field is similar to that of the original matrix image;

calculate a second matrix image corresponding to the original matrix image with a second specified resolution, which comprises a number of pixels similar to that of the first matrix image and in which a corresponding depth of field is greater than that of the original matrix image; and output the depth map that results from implementing a depth from defocus (DFD) type three-dimensional reconstruction algorithm based on the first and the second matrix images, wherein each of the first specified resolution and the second specified resolution is lower than a resolution of the original matrix image.

9. The device according to claim 8, further comprising an acquisition device of the original matrix image.

10. A method for calculating a depth map from an original matrix image, comprising at least the steps of:

calculating, by processing circuitry, a first matrix image corresponding to the original matrix image with a low resolution and in which the depth of field is similar to that of the original matrix image, calculating a second matrix image corresponding to the original matrix image with a low resolution, comprising a number of pixels similar to that of the first matrix image and in which the depth of field is greater than that of the original matrix image, implementing a DFD type three-dimensional reconstruction algorithm from the first and the second matrix images, outputting the depth map, in which the three-dimensional reconstruction algorithm comprises at least the steps of:

digital processing of the second matrix image blurring the second matrix image, dividing the first matrix image and the second blurred matrix image into several groups of pixels, for each group of pixels, calculating a two-dimensional correlation between the groups of pixels of the first matrix image and the groups of pixels of the second blurred matrix image, updating the depth map from the results of the previously calculated two-dimensional correlations.

* * * * *